United States Patent
Opper

(10) Patent No.: US 7,163,186 B2
(45) Date of Patent: Jan. 16, 2007

(54) QUICK-CLOSING VALVE FOR THE INTERRUPTION OF A FLUID FLOW

(75) Inventor: Hans Otto Opper, Berlin (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 102 days.

(21) Appl. No.: 11/002,287

(22) Filed: Dec. 3, 2004

(65) Prior Publication Data

US 2005/0121635 A1  Jun. 9, 2005

(30) Foreign Application Priority Data

Dec. 4, 2003  (DE) ................. 103 57 423

(51) Int. Cl.
*F16K 31/44*  (2006.01)

(52) U.S. Cl. ............... 251/67; 251/68; 251/236

(58) Field of Classification Search ............ 251/66–68, 251/231, 236
See application file for complete search history.

(56) References Cited

U.S. PATENT DOCUMENTS

| | | | | |
|---|---|---|---|---|
| 1,079,104 A | * | 11/1913 | Bowser | 251/66 |
| 1,107,022 A | * | 8/1914 | Block | 251/66 |
| 1,322,076 A | * | 11/1919 | Wheaton | 251/66 |
| 1,525,914 A | * | 2/1925 | Cahow | 251/66 |
| 1,649,735 A | | 11/1927 | Roschanek | |
| 2,181,523 A | * | 11/1939 | Shiels | 251/68 |
| 2,264,655 A | * | 12/1941 | Brackmann | 251/67 |
| 3,095,901 A | * | 7/1963 | Larson et al. | 251/66 |
| 3,137,474 A | * | 6/1964 | Muller et al. | 251/67 |
| 3,185,172 A | * | 5/1965 | Hajek | 251/214 |
| 4,659,063 A | * | 4/1987 | Veillette et al. | 251/68 |
| 4,664,150 A | * | 5/1987 | Steiger | 251/68 |
| 4,712,372 A | | 12/1987 | Dickey | |

FOREIGN PATENT DOCUMENTS

| | | |
|---|---|---|
| DE | 2923719 | 12/1980 |
| DE | 3518430 | 11/1985 |
| DE | 69004658 | 4/1991 |
| DE | 10046998 | 4/2001 |

(Continued)

OTHER PUBLICATIONS

German Search Report dated Jul. 21, 2004.

*Primary Examiner*—John Bastianelli
(74) *Attorney, Agent, or Firm*—Timothy J. Klima

(57) ABSTRACT

A valve housing 1 with valve seat 10 incorporated in a fluid line features a closing element 2 with a valve disk 11 and a valve stem 12 extending through and sealed in the housing wall which, on the outer side, is locked by means of a locking pin 17 actuated by a solenoid. Owing to the geometry of the valve disk and the annular gap 20 as well as the action of a spring element 23, the inlet-side pressure acting upon the closing element 2 exceeds the outlet-side pressure, as a result of which the fluid flow via the annular gap is interrupted in only a few milliseconds merely by the permanently present, higher mechanical pressure if the valve stem is released merely by the movement of the locking pin effected by a small and lightweight solenoid 18, actuated on the basis of a signal indicating an event.

20 Claims, 3 Drawing Sheets

FOREIGN PATENT DOCUMENTS

| | | |
|---|---|---|
| DE | 10159510 | 4/2001 |
| EP | 0753694 | 1/1997 |
| GB | 808577 | 2/1959 |
| GB | 1019937 | 2/1966 |
| GB | 1293375 | 10/1972 |
| GB | 2159249 | 11/1985 |
| WO | WO90/07670 | 7/1990 |

* cited by examiner

QUICK-CLOSING VALVE FOR THE INTERRUPTION OF A FLUID FLOW

This application claims priority to German Patent Application DE10357423.9 filed Dec. 4, 2003, the entirety of which is incorporated by reference herein.

BACKGROUND OF THE INVENTION

This invention relates to a quick-closing valve for the interruption of a fluid flow, in particular, for the interruption of the fuel supply to an aircraft gas turbine in the event of a shaft failure, which comprises a valve housing with a valve seat and a closing element and is incorporated in a fluid line via a fluid inlet and a fluid outlet port.

In many applications, it is necessary to interrupt a media flow as quickly as possible. In the case of jet engines, for example, a shaft failure, in particular the failure of the low-pressure turbine shaft, constitutes a considerable danger to persons and property. In the event of a shaft failure, the energy-producing side of the shaft, which is now detached from the energy-consuming side, will speed up in an uncontrolled manner. Consequently, the engine and the aircraft can be damaged or destroyed. In order to minimize the negative consequences of a shaft failure, it is first of all necessary to register this state as quickly as possible and then to interrupt the further supply of fuel in the shortest time possible on the basis of the signal indicating the shaft failure.

In a known apparatus employing mechanical means for the detection of a shaft failure, power transmission means of the mechanical type are also used for the interruption of the fuel supply, for example a wire rope. Apart from the demanding design and the susceptibility to wear, the time period required by a mechanical trigger to interrupt the fuel flow to the combustion chamber of the aircraft gas turbine is so long that consequential damages can occur.

In an electronic apparatus known from Patent Specification U.S. Pat. No. 4,712,372 for the detection of an overspeed condition and the interruption of the fuel supply, an electric signal is produced in the event of a shaft failure to electromagnetically actuate the closing element of the fuel shut-off valve. However, also with this system, the period from actuation of the solenoid until shut-off of the fuel supply by the closing element of the quick-closing valve is not short enough to safely avoid consequential damages resulting from driving the shaft part into overspeed until the valve responds. In this case, additional safety measures involving high design investment are required.

BRIEF SUMMARY OF THE INVENTION

The present invention provides a quick-closing valve which is capable of interrupting a fluid flow in only a few milliseconds.

It is a particular object of the present invention to provide a solution to the above problems by a valve designed in accordance with the features described herein. Further features and advantageous embodiments of the present invention be apparent from the present description.

The present invention, in its essence, provides for the following: in the case of an electrically signaled event demanding rapid interruption of the further fluid supply, the respective closing valve is not shut directly by an electromagnetic force, but solely by mechanical forces which are permanently present at the locked closing element and become effective when the closing element is electromagnetically unlocked. Since only small forces are required to unlock the closing element by means of a small and lightweight solenoid and the actual closing process is effected solely by the permanently present mechanical forces, the closure time—calculated from the moment of triggering the solenoid—is extremely short. Owing to this extremely short closure time, additional—and costly—design measures otherwise dictated for reasons of safety by long closure times can be dispensed with.

On a quick-closing valve which is incorporated in a fluid line and comprises a valve housing with a fluid inlet and a fluid outlet port and a valve seat with closing element arranged between these ports, one inventive feature is the valve stem which extends out of—and is sealed in—the valve housing and is held in an operating position, in which the fluid continuously flows, by means of a moveable locking element arranged on the outside of the valve housing. The valve disk, which is the closing element and is associated to the valve seat, divides the valve housing into a fluid inlet chamber (first pressure compartment) and a fluid outlet chamber (second pressure compartment) and is connected to the valve stem on the side of the fluid outlet chamber. Because of the effective surface of the valve disk being larger on the fluid inlet side, the force acting upon the closing element is permanently higher in the fluid inlet chamber than on the side of the fluid outlet chamber, as a result of which the higher pressure in the fluid inlet chamber will immediately interrupt the fluid flow in only a few milliseconds if the valve stem is released upon a positional change of the locking element.

Also, in order to minimize the time for the positional change of the locking element, a lever arrangement is provided between the front face of the valve stem and the locking element to provide for the forces acting upon the locking element and coming from the valve stem. Reduction of the force acting upon the locking element facilitates the actuation of the locking element and shortens the actuating time. Accordingly, the time from the presence of the signal at the locking element to the interruption of the fluid flow is, all in all, in the range of only a few milliseconds. A preferred application field of the present invention is aircraft gas turbines. Here, a signal is generated upon the detection of a shaft failure on the basis of which the inventive quick-closing valve interrupts the further fuel supply in less than 5 milliseconds. This provides for a high safety for persons and material and enables a reduction in the costs for a safe design of the engine.

In an advantageous further development of the present invention, which is also aimed at a reduction of the shut-off time, the closing element is guided and subject to an additional spring force also on the fluid inlet side.

Leakages in the area of the valve stem guide are avoided by sealing elements and an annulus for the collection of leaking fluid. The leaking fluid is returned into the system by means of a bore in the valve housing and a pump.

The forces acting upon the closing element on the fluid outlet side can be further reduced in that the valve seat is contoured such that a flow duct between the valve seat and the valve disk is created by which a high flow velocity and, thus, a reduction of the static pressure on the fluid outlet side of the closing element are obtained. This provides for a further reduction of the closing time.

In an advantageous further development of the present invention, the locking element is a locking pin actuated by a solenoid on the basis of an electrical signal generated upon detection of an event (shaft failure in the aircraft gas turbine).

The lever arrangement between valve stem and locking pin, which is intended to facilitate the actuation of the locking pin and reduce the actuating time, is designed such that the locking pin engages the end of the long lever arm of a pivotally angle lever mating with the front face of the valve stem. In a development of this lever arrangement, this angle lever can also be released by means of an interconnected rotary lever which is actuated by the locking pin in its direction of movement.

The lever arrangement can also comprise a hinged lever pivotally connected to the front face of the valve stem whose lateral deflection is released by moving the locking pin, thus enabling the closing process to take place.

BRIEF DESCRIPTION OF THE DRAWINGS

Embodiments of the present invention are more fully described in light of the accompanying drawings. In the drawings.

DETAILED DESCRIPTION OF THE INVENTION

Figure 1:
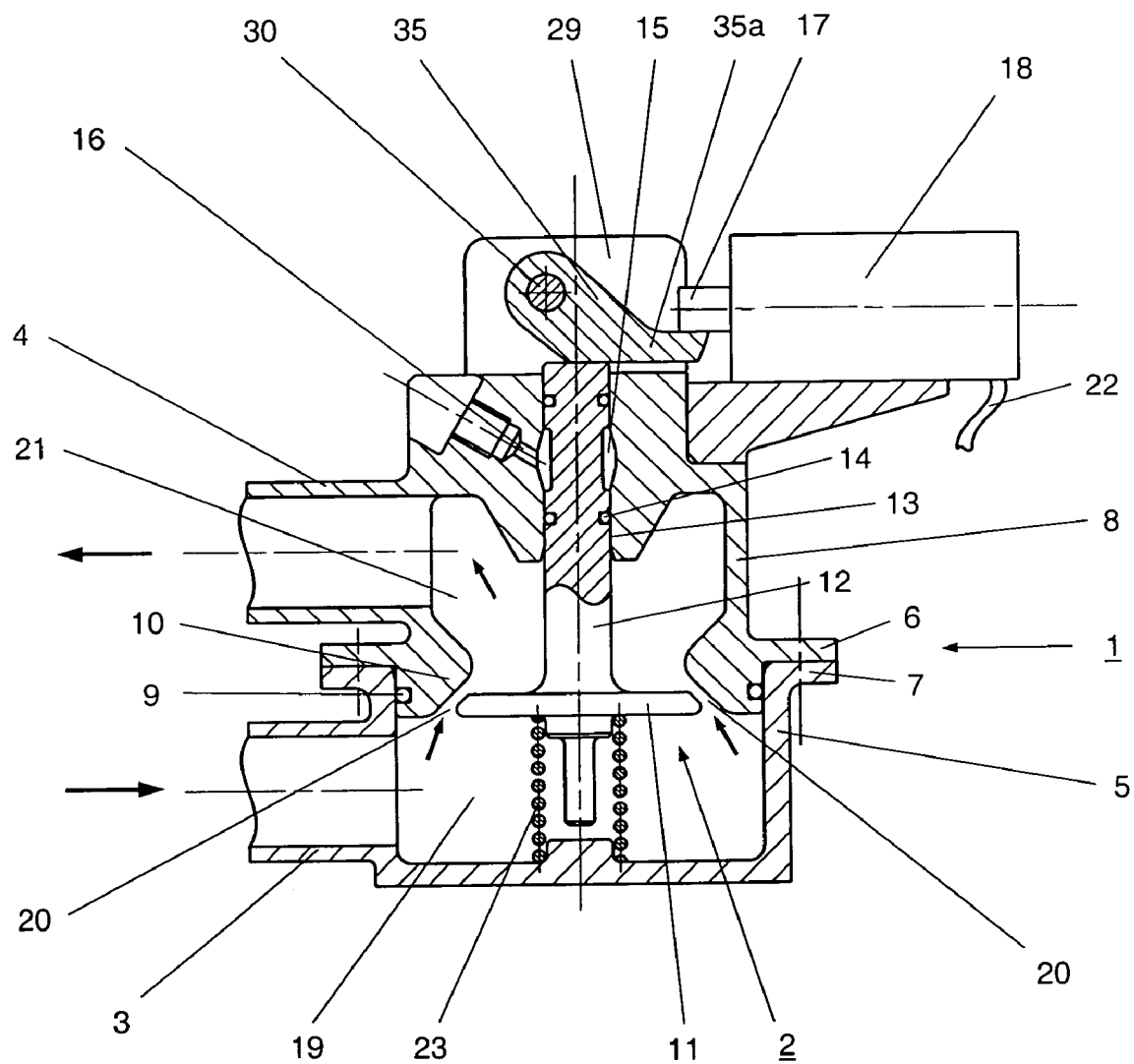
FIG. 1 is a sectional view of a first embodiment of an indirectly electromagnetically actuated quick-closing valve for the interruption of the fuel supply upon a shaft failure in an aircraft gas turbine.
Figure 2:
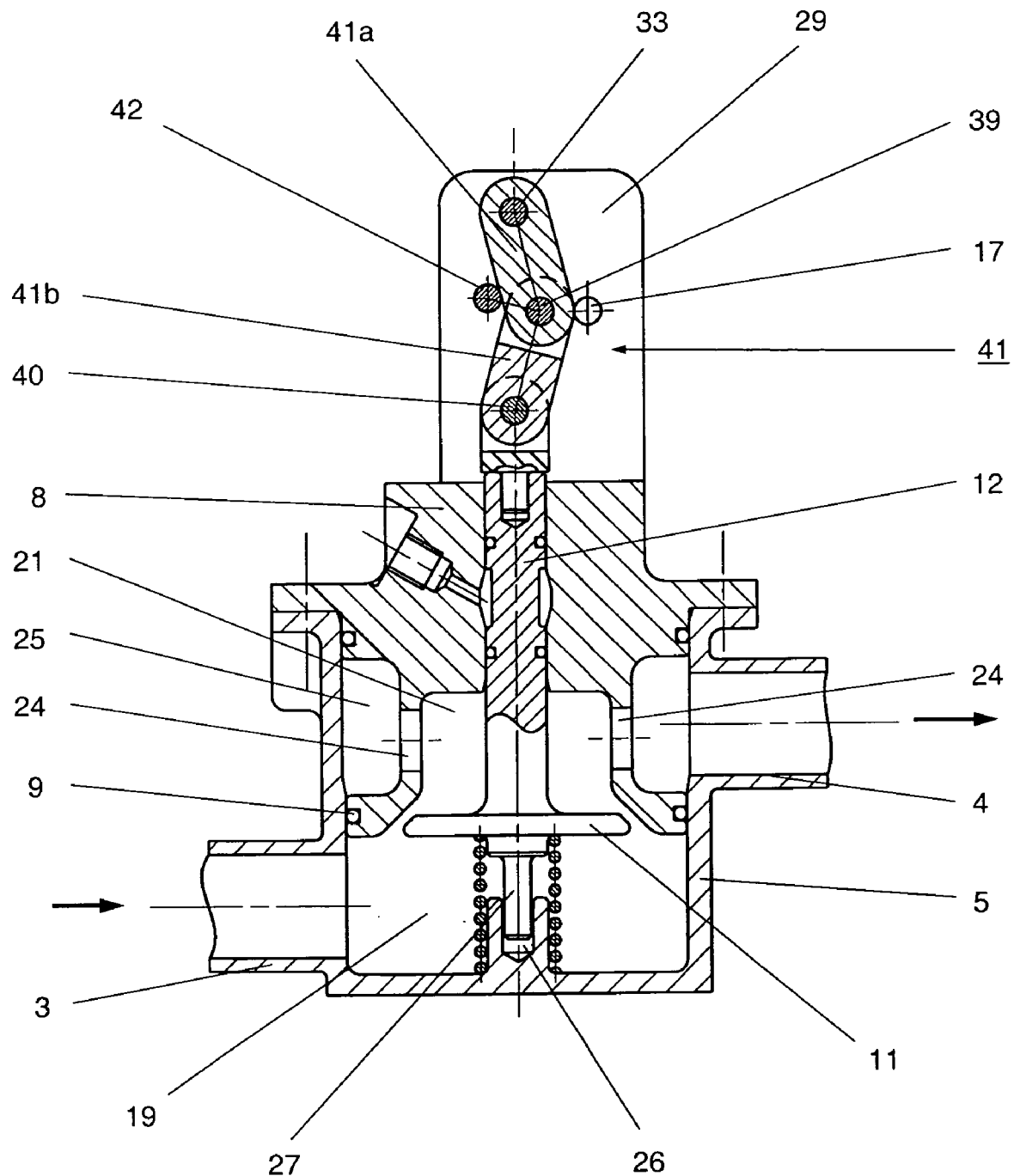
FIG. 2 is a second embodiment of the quick-closing valve according to FIG. 1 with a different design of the valve housing and the release mechanism.
Figure 3:
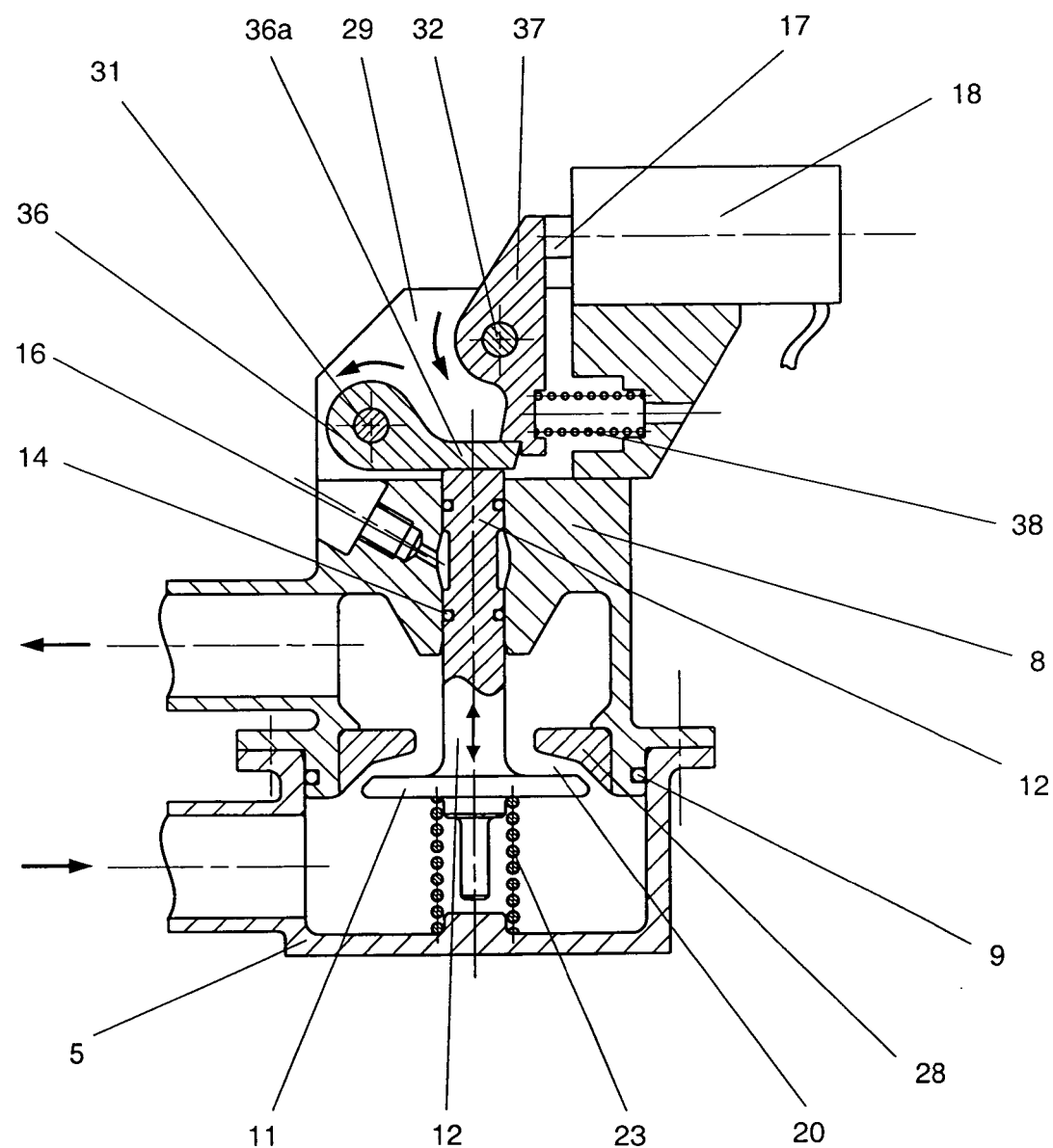
FIG. 3 is a further embodiment of the quick-closing valve with still another variant of the release mechanism and the design of the valve housing.

As shown in FIGS. 1 to 3, the quick-closing valve comprises a valve housing 1, a closing element 2 moveably guided in the valve housing 1, and a trigger mechanism to release the closing movement of the closing element 2 to interrupt the further supply of fuel passing through the valve housing 1 to the combustion chamber of an aircraft gas turbine if a shaft failure is detected and indicated by an electrical signal. The two-part valve housing 1 is incorporated in a fuel line (not shown) via a fluid inlet port 3 and a fluid outlet port 4. It includes a housing base 5 and a housing top 8 attached to the base by means of flanges 6, 7 connected by bolts. Housing seals 9 are provided which seal the housing top to the housing base. The portion of the housing top 8 which engages the housing base 5 and forms a valve seat 10 for a valve disk 11 of the closing element 2 whose valve stem 12 is guided in a valve stem guide 13 provided in the housing top 8 and is sealed in the valve stem guide 13 by means of stem seals 14. The valve stem guide 13 and the valve stem 12 form an annulus 15 to collect leakage fuel which can be drawn off via a bore 16 in the housing top 8 and returned to the fuel tank (not shown).

The valve disk 11, at its bottom side, is subject to the force of a spring element in the form of a helical pressure spring 23. At the front face of the valve stem 12 opposite of the valve disk 11, the closing element 2, i.e. the valve disk 11 provided on the valve stem 12, is held clear of the valve seat 10 by means of the locking pin 17 of a solenoid 18, either directly (not shown) or by means of a lever arrangement explained further below, actually against the spring pressure acting upon the bottom side of the valve disk 11 and the pressure exerted on the valve disk 11 by the flowing medium. In the position in which the closing element 2 is held locked at the front face, i.e. when the solenoid 18, in normal operation, does not receive an electrical signal indicating a shaft failure in the aircraft gas turbine, the fuel flows from the fluid inlet chamber 19 (first pressure compartment below the valve disk 11) via the annular gap 20 between the valve disk 11 and the valve seat 10 into the fluid outlet chamber 21 (second pressure compartment above the valve disk 11) and, from there, via the fluid outlet port 4 and the downstream fuel line to the combustion chamber (both not shown).

In the event of a shaft failure, an electrical signal is generated by means of an apparatus not explained herein and fed to the solenoid 18 via a connecting line 22. Thereupon, the locking pin 17 of the solenoid 18 is withdrawn, releasing the movement of the valve stem 12 such that the valve disk 11, under the effect of the mechanical forces exerted on it, is pressed onto the valve seat 10, thus interrupting the fuel supply. Since the bottom area enclosed by the fluid inlet chamber 19 is larger than the upper area enclosed by the fluid outlet chamber 21 and the inlet-side mechanical forces are significantly higher than the forces exerted by the medium in the fluid outlet chamber 21, the valve disk 11 will be actuated directly by the inlet-side pressure exerted by the fuel and, additionally, by the pressure of the helical pressure spring 23 when the locking pin 17 is withdrawn (released). In order to avoid damages by the high pressure resulting from the closure of the quick-closing valve, a pressure-relief valve (not shown) is provided which normally is already part of the fuel pump.

Accordingly, one aspect of the present invention exemplified in FIGS. 1 to 3 is that the closing movement of the closing element 2 is effected directly by spring pressure and the flowing medium itself since, by virtue of the design of the closing element 2, the pressure on the fuel inlet side exceeds the pressure on the fuel outlet side. Therefore, the fuel supply can be interrupted in a short time upon generation of an electrical signal indicating the shaft failure, i.e. in a period of only a few milliseconds, since the force and time requirements for the release of the locked closing element/valve stem are low.

As shown in FIGS. 1 to 3, the valve housing 1 can have different designs: According to FIG. 2, the housing top 8 is designed such that an outlet compartment 25 is provided downstream of the fluid outlet chamber 19, this outlet compartment 25 being enclosed by the housing top 8 and the sidewall of the housing base 5 and connected via openings 24. In this design of the valve housing 1, a further guide 26 is provided on the bottom of the housing base 5 which locates a pin 27 provided on the bottom side of the valve disk 11. This additional location of the closing element 2 contributes to vibration damping and, thus, to a reduction of the forces exerted by the valve stem 12 on the locking pin 17, especially if flow velocities are high. The lower the force exerted by the closing element 2 onto the locking pin 17, the quicker can the locking pin 17 be withdrawn and the more the closing time of the valve can be reduced upon a shaft failure.

FIG. 3 shows still another variant of the valve housing 1 in which the valve seat 10 is provided as a profiled ring 28. This profiled ring 28 is designed such that it extends relatively far beyond the upper surface of the valve disk 11, as a result of which a long and narrow gap is produced on the upper surface of the valve disk 11 which provides for maximum fuel flow velocity. Consequently, the static pressure on the upper surface of the valve disk 11 will be lower than the pressure on its bottom surface, so that the closing force effected by the fuel in the fluid inlet chamber 19 will be further increased and the quick-closing valve respond even more quickly in the event of a shaft failure.

If the closing element 2 acts directly on the locking pin 17 of the solenoid 18, the forces and corresponding time requirements for withdrawing the locking pin will be high. In order to minimize the force exerted by the valve stem 12 on the locking pin 17 and to enable the locking pin 17 to be withdrawn as quickly as possible with low force, various lever mechanisms are provided which are explained in the following in the light of FIGS. 1 to 3.

For rotatable location of the levers situated between the locking pin 17 and the valve stem 12, brackets 29 are attached to the housing top 8 of the valve housing 1 between which fulcrums 30 to 33 are arranged for pivotable location of the levers or the lever system, respectively. According to FIG. 1, an angle lever 35 is located on the fulcrum 30 whose angled, long lever arm 35a rests, on one end, on the front face of the valve stem 12 and, on the opposite end, is held by the locking pin 17 of the solenoid 18. Owing to the interconnection of the long lever arm 35a, the force acting upon the locking pin 17 is relatively small, allowing the locking pin 17 to be quickly withdrawn by the solenoid 18 and the time between indication of a shaft failure by an electrical signal present at the solenoid and closure of the quick-closing valve to be further reduced, ultimately to only a few milliseconds.

The closing time can further be reduced if the locking pin 17 is not subject to a vertical force, but is held axially in its direction of movement, as shown in FIG. 3. In this variant, the long lever arm 36a of an angle lever 36 pivotable around the fulcrum 31 is locked by a rotary lever 37 pivotable around the fulcrum 32 and retained by a spring 38. If an electrical signal is generated upon a shaft failure, the locking pin 17 is deployed from the solenoid 18 in the direction of the rotary lever 37. The swiveling motion of the rotary lever 37 releases the angle lever 36 and, thus, the movement of the closing element 2.

A third design variant of the lever mechanism for releasing the closing movement of the closing element 2 is shown in FIG. 2. A hinged lever 41 including two parts 41a, b connected by a first swivel joint 39 is firmly connected by a second swivel joint 40 to the front face of the valve stem 12. At its free end, the hinged lever 41 is pivotable around a fixed fulcrum 33 and, in the operating mode, locked in an angled position between a fixed stop 42 and the locking pin 17 moveable by the solenoid 18. If an electrical signal is generated upon a shaft failure, the locking pin 17 is withdrawn and the angular movement of the hinged lever 41 and, thus, the closing movement of the closing element 2, is enabled.

In principle, the locking pin 17 can also interact directly with the free front face of the valve stem 12. However, in this case, the lateral forces acting upon the locking pin 17 and the armature of the solenoid 18 will have a disadvantageous effect on the closing time. In this case, it is possible to decouple a guided locking pin (not shown) from the solenoid by means of an articulated joint so that lateral forces are prevented from acting upon the armature.

The present invention is not confined to the variants exemplified in the above. Various modifications purely of design are possible within the framework of the concept of the present invention, according to which a locking pin actuated by a solenoid indirectly holds the closing element of a quick-closing valve, which is subject to higher pressure on the fuel inlet side than on the fuel outlet side, in an operating position and releases the closing element upon a signal generated by an event to interrupt the medium flow directly by the pressure produced by the medium itself. In the above embodiments, the locking pin is always actuated by an electrical signal supplied to a solenoid. With considerable time delay between detection of the event and actuation of the locking pin, the locking pin can also be actuated mechanically, for example by means of a wire rope. Also in this case, the pure closing time of the quick-closing valve is in a low milliseconds range.

LIST OF REFERENCE NUMERALS

1 Valve housing
2 Closing element
3 Fluid inlet port
4 Fluid outlet port
5 Housing base
6 Flange
7 Flange
8 Housing top
9 Housing seal
10 Valve seat
11 Valve disk
12 Valve stem
13 Valve stem guide
14 Stem seals
15 Annulus (for the collection of leakage fluid)
16 Bore
17 Locking element (locking pin)
18 Solenoid
19 Fluid inlet chamber
20 Annular gap between 19 and 21
21 Fluid outlet chamber
22 Connecting line
23 Spring element/helical pressure spring
24 Opening in 8
25 Outlet compartment
26 Guide in 5
27 Pin of 11
28 Profiled ring (valve seat)
29 Brackets
30 Fulcrum of 35
31 Fulcrum of 36
32 Fulcrum of 37
33 Fulcrum of 41
35 Angle lever
35a Long lever arm
36 Angle lever
36a Long lever arm
37 Rotary lever
38 Spring
39 First swivel joint of 41
40 Second swivel joint of 41
41 Hinged lever
41a, b Lever parts of 41
42 Stop

What is claimed is:

1. A quick-closing valve for the interruption of a fluid flow, comprising:
 a valve housing including a fluid inlet port and a fluid outlet port for incorporation into a fluid line;
 a valve seat and a closing element positioned between the fluid inlet port and the fluid outlet port;
 wherein the closing element comprises a valve stem extending our of, and being sealed with respect to, the valve housing, the valve stem being held outside of the valve housing by a locking element in an open position enabling fluid to flow between the closing element and the valve seat, with the closing element being constructed and arranged such that a pressure acting upon the closing element on the fluid inlet side exceeds a fluid pressure acting upon the closing element on the fluid outlet side, such that the quick-closing valve is moved to a closed position directly by the higher inlet-side pressure upon release of the valve stem by the locking element;

the locking element being a locking pin which indirectly interacts with a free front face of the valve stem via a lever arrangement provided between the locking pin and the valve stem for force de-coupling, the locking pin being actuatable by a solenoid attached to the valve housing on the basis of an electrical signal generated upon detection of an event;

the lever arrangement comprising an angle lever having a lever arm pivotable around a fulcrum attached to the valve housing, the lever arm resting, at a fulcrum side, on the free front face of the valve stem and engageable with, at a free end, the moveable locking pin, the lever arm constructed and arranged to pivot away from the free front face of the valve stem when disengaged from the locking pin to allow the valve stem to move to the closed position.

2. A quick-closing valve in accordance with claim 1, wherein the closing element comprises a valve disk connected to the valve stem, which, in an open flow operating position, forms an annular gap with the valve seat, with an inlet-side surface of the valve disk being larger than its outlet-side surface to obtain a higher pressure on the inlet side of the disk.

3. A quick-closing valve in accordance with claim 2, wherein a contour of the valve seat towards the outlet-side surface of the valve disk is such that in the open flow position a channel-type, narrow annular gap providing for increased fluid flow velocity through the annular gap is created to reduce a static pressure on the outlet side of the valve disk.

4. A quick-closing valve in accordance with claim 2, and further comprising a spring element connected to the closing element to further increase the pressure acting upon the valve disk on the fluid inlet side.

5. A quick-closing valve in accordance with claim 1, wherein the valve housing comprises:
a housing base including fluid inlet port,
a housing top including the fluid outlet port, the valve seat, and a valve stem guide open at both ends to receive the valve stem, and
at least one stem seal positioned to create a seal between the valve stem and the valve stem guide.

6. A quick-closing valve in accordance with claim 5, and further comprising an annulus confined by the valve stem and the valve stem guide for the collection of leakage fluid, the annulus connected to a bore in the housing top for discharge of the leakage fluid.

7. A quick-closing valve in accordance with claim 5, wherein the housing base further includes a guide for positioning an inlet side pin of the valve stem.

8. A quick-closing valve in accordance wit claim 1, wherein the lever arrangement further comprises a rotary lever pivotally disposed between the lever arm and the locking pin and having a first end to engage and hold the lever arm in engagement with free front face of the valve stem and a second end which engages the locking pin, such that movement of the locking pin to cause movement of the second end also causes the first end of the rotary lever to disengage the lever arm so that the lever arm can pivot away from the free front face of the valve stem and allow the valve stem to move to the closed position.

9. A quick-closing valve in accordance with claim 5, wherein the valve seat is an integral part of the housing top.

10. A quick-closing valve in accordance with claim 5, wherein the valve seat is a separate profiled ring connected to the housing top.

11. A quick-closing valve in accordance with claim 5, wherein the closing element comprises a valve disk connected to the valve stem, which, in an open flow operating position, forms an annular gap with the valve seat, with an inlet-side surface of the valve disk being larger than its outlet-side surface to obtain a higher pressure on the inlet side of the disk.

12. A quick-closing valve in accordance with claim 11, wherein a contour of the valve seat towards the outlet-side surface of the valve disk is such that in the open flow position a channel-type, narrow annular gap providing for increased fluid flow velocity through the annular gap is created to reduce a static pressure on the outlet side of the valve disk.

13. A quick-closing valve in accordance with claim 11, and further comprising a spring element connected to the closing element to further increase the pressure acting upon the valve disk on the fluid inlet side.

14. A quick-closing valve in accordance with claim 1, wherein the lever arm is directly engageable with the moveable locking pin.

15. A quick-closing valve for the interruption of a fluid flow, comprising:
a valve housing including a fluid inlet port and a fluid outlet port for incorporation into a fluid line;
a valve seat and a closing element positioned between the fluid inlet port and the fluid outlet port;
wherein the closing element comprises a valve stem extending out of, and being sealed with respect to, the valve housing, the valve stem being held outside of the valve housing by a locking element in a position enabling fluid to flow between the closing element and the valve seat, with the closing element being constructed and arranged such that a pressure acting upon the closing element on the fluid inlet side exceeds a fluid pressure acting upon the closing element on the fluid outlet side, such that the quick-closing valve is shut directly by the higher inlet-side pressure upon release of the valve stem by the locking element;
wherein the valve housing comprises:
a housing base including fluid inlet port,
a housing top including the fluid outlet port, the valve seat, and a valve stem guide open at both ends to receive the valve stem, and
at least one stem seal positioned to create a seal between the valve stem and the valve stem guide,
and further comprising an annulus confined by the valve stem and the valve stem guide for the collection of leakage fluid, the annulus connected to a bore in the housing top for discharge of the leakage fluid.

16. A quick-closing valve in accordance with claim 15, wherein the locking element is a locking pin which indirectly interacts with a free front face of the valve stem via a lever arrangement provided between the locking pin and the valve stem for force de-coupling, the locking pin being actuatable by a solenoid attached to the valve housing on the basis of an electrical signal generated upon detection of an event.

17. A quick-closing valve in accordance with claim 16, wherein the lever arrangement comprises a hinged lever having a first part pivotally connected on end to the front face of the valve stem and a second part connected to a fixed pivot at one end, the two parts being interconnected between the pivot connections by a swivel joint, the hinged lever being held in position by a fixed stop on one side and the moveable locking pin on an opposite side.

18. A quick-closing valve in accordance with claim 16, wherein the locking pin is decoupled from the valve stem by an articulated, guided extension arresting the valve stem.

19. A quick-closing valve in accordance with claim 16, wherein the closing element comprises a valve disk connected to the valve stem, which, in an open flow operating position, forms an annular gap with the valve seat, with an inlet-side surface of the valve disk being larger than its outlet-side surface to obtain a higher pressure on the inlet side of the disk.

20. A quick-closing valve in accordance with claim 19, and further comprising a spring element connected to the closing element to further increase the pressure acting upon the valve disk on the fluid inlet side.

* * * * *